(12) United States Patent
Tanabe

(10) Patent No.: US 7,508,796 B2
(45) Date of Patent: Mar. 24, 2009

(54) WIRELESS BASE STATION, WIRELESS FRAMES SYNCHRONIZATION DETECTION METHOD USED THEREIN, AND RECORDING MEDIUM ON WHICH PROGRAM THEREFOR IS RECORDED

(75) Inventor: Yoichi Tanabe, Kanagawa (JP)

(73) Assignee: NEC Corporation, Tokyo (JP)

( * ) Notice: Subject to any disclaimer, the term of this patent is extended or adjusted under 35 U.S.C. 154(b) by 855 days.

(21) Appl. No.: 10/513,463

(22) PCT Filed: Jul. 28, 2003

(86) PCT No.: PCT/JP03/09549

§ 371 (c)(1),
(2), (4) Date: Nov. 8, 2004

(87) PCT Pub. No.: WO2004/016028

PCT Pub. Date: Feb. 19, 2004

(65) Prior Publication Data

US 2005/0202837 A1 Sep. 15, 2005

(30) Foreign Application Priority Data

Jul. 31, 2002 (JP) ............................. 2002-222294

(51) Int. Cl.
*H04B 7/216* (2006.01)
*H04B 1/00* (2006.01)
*H04J 13/00* (2006.01)

(52) U.S. Cl. .................. 370/335; 370/342; 370/441; 370/479; 375/143; 375/144

(58) Field of Classification Search .............. 370/320, 370/328–329, 335, 342, 441, 479; 375/143–144, 375/147–148, 346–349
See application file for complete search history.

(56) References Cited

U.S. PATENT DOCUMENTS

| | | | | |
|---|---|---|---|---|
| 5,719,899 | A * | 2/1998 | Thielecke et al. | 375/144 |
| 5,838,669 | A * | 11/1998 | Gerakoulis | 370/320 |
| 6,141,337 | A | 10/2000 | Uta et al. | |
| 6,804,314 | B2 * | 10/2004 | Kobori | 375/354 |
| 6,977,910 | B1 * | 12/2005 | Hosur et al. | 370/318 |
| 7,356,007 | B2 * | 4/2008 | Nishimura | 370/335 |
| 2001/0024429 | A1 * | 9/2001 | Sekine et al. | 370/331 |
| 2002/0044619 | A1 | 4/2002 | Kobori | |

FOREIGN PATENT DOCUMENTS

| | | |
|---|---|---|
| JP | H09-275582 A | 10/1997 |
| JP | H10-145329 A | 5/1998 |
| JP | 2000-151466 A | 5/2000 |
| JP | 2001-111448 A | 4/2001 |
| JP | 2002-050983 A | 2/2002 |
| JP | 2002-124936 A | 4/2002 |

OTHER PUBLICATIONS

Keiji Tatekawa, "W-CDMA Mobile Communication Method", Jun. 25, 2001, Maruzen Kabushiki Kaisha.

* cited by examiner

*Primary Examiner*—Tri H. Phan
(74) *Attorney, Agent, or Firm*—Sughrue Mion, PLLC

(57) ABSTRACT

In a baseband processing unit in a node-B, a path search circuit includes a path capture unit, path track transfer unit, and channel estimation unit, all of which are primarily provided for the path capture, channel estimation, and RAKE combination. In the baseband processing unit, a synchronization determination circuit includes a decoding unit provided for decoding RAKE-combined data and calculating an average SIR per wireless frame and a correction calculation unit primarily provided for reliably and stably detecting wireless frame synchronization. The processing time required to detect synchronization establishment during wireless frame synchronization determination is shortened.

17 Claims, 13 Drawing Sheets

FIG. 6

| Slot Format #1 | Chanel Bit Rate (kbps) | Chanel Symbol Rate (kbps) | SF | Bits/Frame | Bits/Slot | $N_{pilot}$ | $N_{TPC}$ | $N_{TPCI}$ | $N_{FBI}$ | Transmitted slots per radio frame |
|---|---|---|---|---|---|---|---|---|---|---|
| 0  | 15 | 15 | 256 | 150 | 10 | 6 | 2 | 2 | 0 | 15 |
| 0A | 15 | 15 | 256 | 150 | 10 | 5 | 2 | 3 | 0 | 10-14 |
| 0B | 15 | 15 | 256 | 150 | 10 | 4 | 2 | 4 | 0 | 8-9 |
| 1  | 15 | 15 | 256 | 150 | 10 | 8 | 2 | 0 | 0 | 8-15 |
| 2  | 15 | 15 | 256 | 150 | 10 | 5 | 2 | 2 | 1 | 15 |
| 2A | 15 | 15 | 256 | 150 | 10 | 4 | 2 | 3 | 1 | 10-14 |
| 2B | 15 | 15 | 256 | 150 | 10 | 3 | 2 | 4 | 1 | 8-9 |
| 3  | 15 | 15 | 256 | 150 | 10 | 7 | 2 | 0 | 1 | 8-15 |
| 4  | 15 | 15 | 256 | 150 | 10 | 6 | 2 | 0 | 2 | 8-15 |
| 5  | 15 | 15 | 256 | 150 | 10 | 5 | 1 | 2 | 2 | 15 |
| 5A | 15 | 15 | 256 | 150 | 10 | 4 | 1 | 3 | 2 | 10-14 |
| 5B | 15 | 15 | 256 | 150 | 10 | 3 | 1 | 4 | 2 | 8-9 |

FIG. 7

| Bit # / Slot # | N pilot = 3 | | | N pilot = 4 | | | | N pilot = 5 | | | | | N pilot = 6 | | | | | |
|---|---|---|---|---|---|---|---|---|---|---|---|---|---|---|---|---|---|---|
| | 0 | 1 | 2 | 0 | 1 | 2 | 3 | 0 | 1 | 2 | 3 | 4 | 0 | 1 | 2 | 3 | 4 | 5 |
| 0 | 1 | 1 | 1 | 1 | 1 | 1 | 1 | 1 | 1 | 1 | 1 | 1 | 1 | 1 | 1 | 1 | 1 | 1 |
| 1 | 0 | 0 | 1 | 1 | 0 | 0 | 1 | 0 | 0 | 1 | 1 | 0 | 1 | 0 | 0 | 1 | 1 | 0 |
| 2 | 0 | 1 | 1 | 1 | 1 | 1 | 1 | 0 | 1 | 1 | 0 | 0 | 1 | 1 | 1 | 1 | 1 | 0 |
| 3 | 0 | 0 | 1 | 0 | 0 | 0 | 1 | 0 | 0 | 0 | 0 | 1 | 0 | 0 | 0 | 1 | 0 | 0 |
| 4 | 1 | 1 | 1 | 1 | 1 | 1 | 1 | 1 | 1 | 1 | 1 | 0 | 1 | 1 | 1 | 1 | 1 | 1 |
| 5 | 1 | 1 | 1 | 1 | 1 | 1 | 1 | 1 | 1 | 1 | 1 | 1 | 1 | 1 | 1 | 1 | 1 | 0 |
| 6 | 1 | 0 | 1 | 1 | 0 | 1 | 1 | 1 | 0 | 1 | 0 | 0 | 1 | 0 | 1 | 1 | 0 | 0 |
| 7 | 0 | 1 | 1 | 0 | 1 | 1 | 1 | 0 | 1 | 1 | 0 | 0 | 0 | 1 | 1 | 1 | 1 | 0 |
| 8 | 1 | 0 | 1 | 1 | 0 | 0 | 1 | 1 | 0 | 0 | 1 | 1 | 1 | 0 | 0 | 1 | 0 | 0 |
| 9 | 0 | 1 | 1 | 0 | 1 | 1 | 1 | 0 | 1 | 0 | 1 | 1 | 0 | 1 | 1 | 1 | 1 | 1 |
| 10 | 1 | 1 | 1 | 1 | 1 | 1 | 1 | 1 | 1 | 1 | 0 | 1 | 1 | 1 | 1 | 1 | 0 | 1 |
| 11 | 1 | 0 | 1 | 1 | 0 | 1 | 1 | 1 | 0 | 0 | 1 | 0 | 1 | 1 | 0 | 1 | 1 | 1 |
| 12 | 0 | 0 | 1 | 0 | 0 | 0 | 1 | 0 | 0 | 0 | 0 | 1 | 1 | 0 | 0 | 1 | 0 | 1 |
| 13 | 0 | 0 | 1 | 0 | 0 | 0 | 1 | 0 | 0 | 0 | 1 | 0 | 1 | 0 | 1 | 1 | 1 | 1 |
| 14 | 0 | 0 | 1 | 0 | 0 | 0 | 1 | 0 | 0 | 0 | 1 | 1 | 1 | 0 | 1 | 1 | 1 | 1 |

FIG. 8

| PILOT BIT PATTERN | 6 Symbol / Slot<br>(Uplink DPCCH Slot Frame #0) |
|---|---|
| NUMBER OF FRAME SYNCHRONIZATION WORD BITS | 4 Symbol / Slot<br>*15 Time Slot = 60 Symbol |
| Fading Vector GENERATION METHOD | ZERO-ORDER INTERPOLATION<br>(WEIGHTING COEFFICIENT : 0.45, 0.18, 0.09) |

WIRELESS BASE STATION, WIRELESS FRAMES SYNCHRONIZATION DETECTION METHOD USED THEREIN, AND RECORDING MEDIUM ON WHICH PROGRAM THEREFOR IS RECORDED

BACKGROUND OF THE INVENTION

The present invention relates to a wireless base station, a wireless frame synchronization detection method used therein, and a recording medium on which a program therefor is recorded and, more particularly, to a wireless frame synchronization detection method of detecting wireless frame synchronization in a wireless base station (node-B) which performs communication by using the CDMA (Code Division Multiple Access) method.

The conventional general wireless frame synchronization method in node-B described in "W-CDMA (Wideband Code Division Multiple Access) Mobile Communication Method" (supervised by Keiji Tatekawa, and issued on Jun. 25, 2001 by Maruzen Kabushiki Kaisha)" will be described below.

The CDMA method describes the definitions of a transmission channel and physical channel, and the explanation of the definitions. The physical channel normally has a hierarchical arrangement including wireless frames and time slots, and the forms of the wireless frames and time slots change in accordance with the symbol rate of the physical channel.

The wireless frame is made up of 15 time slots, and is a minimum unit of signal processing. The time slot is a minimum constituting unit of a layer 1-bit sequence, and is a minimum processing unit of transmit power control and a channel estimation process. The number of bits in one time slot depends upon the physical channel.

Of the physical channels described above, in an uplink DPCH (Dedicated Physical Channel), two types, i.e., a DPDCH (Dedicated Physical Data Channel) used for data transmission and a DPCCH (Dedicated Physical Control Channel) used to transmit physical control information are multiplexed by I/Q [In-phase/Quadrature] for each wireless frame.

The DPCCH for handling control information is made up of pilot bits (Pilot) having a known pattern used for estimation in synchronization detection, a transmit power control command (TPC: Transmit Power Control), feedback information (FBI: Feedback Information), and a TFCI (Transport Format Combination Indicator).

FIG. 9 shows the wireless frame arrangement of the uplink DPCCH described above. Referring to FIG. 9, each wireless frame (10 ms) is divided into 15 slots, and one slot has 2,560 chips. The number of bits per slot of the uplink DPDCH/DPCCH is determined by a parameter k, and the parameter k corresponds to SF (Spreading Factor)=256/2 k of the physical channel. The SF of the DPDCH is set within the range of 256 to 4, and 256 (a fixed value) is set as the SF of the DPCCH. A slot format to be used in the DPCCH is determined by the use/nonuse of the TFCI, the use (the number of bits used)/nonuse of the FGI, and the application (the number of transmission slots)/non-application of a compression mode.

The CDMA method performs channel estimation by using the pilot bits, and detects frame synchronization by using an SW (Sync Word) contained in the pilot bits. As shown in FIG. 10, the conventionally general wireless frame synchronization detection method detects wireless frame synchronization establishment and synchronization pull out by using the correlation characteristics of the SW.

That is, in this wireless frame synchronization detection method, the pilot bits of the uplink DPCCH received in node-B are compared with a reference pilot bit pattern used for channel estimation, and, if the number of mismatch bits is equal to or smaller than a preset number of pilot error allowable bits, it is determined that pilot bit reception is OK.

Also, in the wireless frame synchronization detection method, if this pilot bit OK state continues for a predetermined frame period (a critical value used in this determination is called the number of frame synchronization backward protection steps), it is determined that wireless frame synchronization establishment is detected, and, if the pilot bit reception NG state continues for the predetermined frame period (a critical value used in this determination is called the number of frame synchronization forward protection steps), it is determined that wireless frame synchronization pull out is detected.

Referring to FIG. 10, in the above wireless frame synchronization detection method, after the start of synchronization establishment, pilot bit reception OK detection is started from wireless frame synchronization state=initial state (A), and, if a wireless frame period in which pilot bit reception is OK continues and becomes equal to or larger than the critical value: the number of frame synchronization backward protection steps, the process advances to wireless frame synchronization state=synchronization establishment (B) (a in FIG. 10).

Also, in the wireless frame synchronization detection method, pilot bit reception NG detection is started from wireless frame synchronization state=synchronization establishment (B), and, if a wireless frame period in which pilot bit reception is NG continues and becomes equal to or larger than the critical value: the number of frame synchronization forward protection steps, the process advances to wireless frame synchronization state=synchronization pull out (C) (b in FIG. 10).

In addition, in the wireless frame synchronization detection method, pilot bit reception OK detection is started from wireless frame synchronization state=synchronization pull out (C), and, if a wireless frame period in which pilot bit reception is OK continues and becomes equal to or larger than the critical value: the number of frame synchronization backward protection steps, the process advances to wireless frame synchronization state=synchronization establishment (B) (c in FIG. 10).

Furthermore, in the wireless frame synchronization detection method, a call is released from wireless frame synchronization state=synchronization establishment (B), or from wireless frame synchronization state=synchronization pull out (C), and the process advances to wireless frame synchronization state=initial state (A) (d in FIG. 10).

In the conventional general wireless frame synchronization detection method described above, however, the pilot error allowable bits and the number of frame synchronization protection steps used in the method are arbitrarily set for each node-B, so the standards for wireless frame synchronization establishment detection and synchronization pull out detection change in accordance with an arbitrary combination of a UE (User Equipment: mobile station) and node-B.

Accordingly, unified standards for wireless frame synchronization establishment detection, synchronization pull out detection, and synchronization maintenance detection are required even in an arbitrary UE and node-B, and a method of determining wireless frame synchronization by a more accurate method is being studied.

Also, in the conventional wireless frame synchronization determination method, wireless frame synchronization establishment may be detected by error in a wireless frame even if no upward signal is received. This is presumably caused by the following mechanism.

In a path capture process, a plurality of paths may be notified to a channel estimation means, even if there is no signal, depending on the set value of a path detection threshold. If channel estimation is performed for each path and phase correction is performed for the path by using a carrier wave phase having the highest correlation to the pilot bit pattern, a value closer to the pilot bit pattern than that when the output value of each path is random may be obtained.

Furthermore, if pilot bits output by RAKE combination of the value are equal to or smaller than the pilot error allowable bits, a synchronization establishment error occurs in a wireless frame.

This phenomenon occurs extremely generally not only in the CDMA system but also in any wireless system in which phase estimation is performed using the pilot bits, and wireless frame synchronization is determined using the pilot bit pattern after RAKE combination.

The foregoing is also obvious from the results of the simple simulation described below, and it is possible to confirm that a synchronization establishment error surely occurs by the above mechanism. The conditions of individual items in the channel estimation means used during the simulation are as shown in FIG. 11.

White noise is used as an input signal, and the weighted mean of the channel estimation values of two forward time slots and two backward time slots (a total of five time slots) is calculated, thereby estimating an FV (Fading Vector). This FV is used to perform phase correction and RAKE combination for the input signal, the degree of matching between an FSW (Frame Synchronous Word) contained in the signal and a transmission pattern is checked, and it is found that the FSW is four symbols out of six symbols of the pilot bit pattern per slot, and a total of 60 symbols are contained in one wireless frame.

FIG. 12 shows the simulation results plotted as a histogram. When no phase correction is performed, a wide distribution centering around 30 symbols is obtained as expected. When phase correction is performed, the center is around 40 symbols even when the number of captured paths is 1 (unit: path), and the degree of matching increases after that as the number of captured paths increases. When the number of captured paths is 10 (unit: path), the degree of matching reaches 56 or 57 symbols.

SUMMARY OF THE INVENTION

It is an object of the present invention to provide a wireless base station capable of reducing the processing time before synchronization establishment is detected in wireless frame synchronization determination, a wireless frame synchronization detection method used therein, and a recording medium on which a program therefor is recorded.

A first wireless base station according to the present invention is a wireless base station which communicates by a CDMA (Code Division Multiple Access) method, comprising path capture means for setting a temporary captured path near a preset propagation delay when a signal is received from a state in which no upward signal is input, and performing a normal path capture process for the input signal.

A second wireless base station according to the present invention further comprises, in addition to the above arrangement, path track transfer means for transferring path information captured by the path capture means to a new resource capable of processing, if processing cannot be performed due to hard handover control, wherein the path capture means performs the normal path capture process by using the path information from an original resource.

A third wireless base station according to the present invention further comprises, in addition to the above arrangement, channel estimation means for performing channel estimation, RAKE combination, and signal-to-interference ratio measurement per slot for a path captured by the path capture means, decoding means for decoding a RAKE-combined pilot data sequence obtained by the channel estimation means, and calculating an average per wireless frame of the signal-to-interference ratios measured for individual slots, and correction calculation means for determining whether pilot bit reception is OK or NG on the basis of pilot bit information per wireless frame decoded by the decoding means, and determining whether signal-to-interference ratio determination is OK or NG with respect to signal-to-interference ratio average information measured by the decoding means, the correction calculation means comprising a pilot bit determination unit which determines whether pilot bit reception is OK or NG, an SIR determination unit which determines whether signal-to-interference ratio determination is OK or NG, and a synchronization establishment determination unit which determines wireless frame synchronization by using results of the determination of pilot bit reception OK/NG and the determination of signal-to-interference ratio determination OK/NG.

A fourth wireless base station according to the present invention has the above arrangement in which the pilot bit determination unit determines whether pilot bit reception is OK or NG on the basis of a parameter based on the number of pilot bits in an uplink DPCCH (Dedicated Physical Control Channel) per wireless frame when all slots of one wireless frame are received when an up slot format to be used changes, and a critical value for performing the determination of pilot bit reception OK/NG in wireless frame synchronization determination.

A first wireless frame synchronization detection method according to the present invention is a wireless frame synchronization detection method of determining wireless frame synchronization in a wireless base station which communicates by a CDMA (Code Division Multiple Access) method, comprising the steps of setting a propagation delay, setting a temporary captured path near the propagation delay when a signal is received from a state in which no upward signal is input, and performing a normal path capture process for the input signal.

A second wireless frame synchronization detection method according to the present invention further comprising, in addition to the above processes, the steps of transferring path information captured by the normal path capture process to a new resource capable of processing, if processing cannot be performed due to hard handover control, and performing the normal path capture process by using the path information from an original resource.

A third wireless frame synchronization detection method according to the present invention further comprises, in addition to the above processes, the steps of performing channel estimation, RAKE combination, and signal-to-interference ratio measurement per slot for a path captured by the normal path capture process, decoding a RAKE-combined pilot data sequence, calculating an average per wireless frame of the signal-to-interference ratios measured for individual slots, determining whether pilot bit reception is OK or NG on the basis of decoded pilot bit information per wireless frame, determining whether signal-to-interference ratio determination is OK or NG with respect to signal-to-interference ratio average information, and determining wireless frame synchronization by using results of the determination of pilot bit reception OK/NG and the determination of signal-to-interference ratio determination OK/NG.

In a fourth wireless frame synchronization detection method according to the present invention, the step of determining whether pilot bit reception is OK or NG comprises the step of determining whether pilot bit reception is OK or NG on the basis of a parameter based on the number of pilot bits in an uplink DPCCH (Dedicated Physical Control Channel) per wireless frame when all slots of one wireless frame are received when an up slot format to be used changes, and a critical value for performing the determination of pilot bit reception OK/NG in wireless frame synchronization determination.

A first computer-readable recording medium recording a program of a wireless frame synchronization detection method according to the present invention is a computer-readable recording medium recording a program of a wireless frame synchronization detection method of determining wireless frame synchronization in a wireless base station which communicates by a CDMA (Code Division Multiple Access) method, wherein the program comprises a program which allows a computer to function as path capture means for setting a temporary captured path near a preset propagation delay when a signal is received from a state in which no upward signal is input, and performing a normal path capture process for the input signal.

A second computer-readable recording medium recording the program of the wireless frame synchronization detection method according to the present invention further comprises, in addition to the above processes, a program which allows a computer to function as path track transfer means for transferring path information captured by the normal path capture process to a new resource capable of processing, if processing cannot be performed due to hard handover control, and as path capture means for performing the normal path capture process by using the path information from an original resource.

A third computer-readable recording medium recording the program of the wireless frame synchronization detection method according to the present invention further comprises, in addition to the above processes, a program which allows a computer to function as channel estimation means for performing channel estimation, RAKE combination, and signal-to-interference ratio measurement per slot for a path captured by the normal path capture process, decoding means for decoding a RAKE-combined pilot data sequence, and calculating an average per wireless frame of the signal-to-interference ratios measured for individual slots, and correction calculation means for performing the wireless frame synchronization determination by determining whether pilot bit reception is OK or NG on the basis of decoded pilot bit information per wireless frame, and determining whether signal-to-interference ratio determination is OK or NG with respect to signal-to-interference ratio average information.

BRIEF DESCRIPTION OF DRAWINGS

FIG. 6 is a view showing the wireless frame structure of an uplink DPCCH in the CDMA method;

FIG. 7 is a view showing pilot bit patterns when the Npilot data sizes of an uplink DPCCH are 3, 4, 5, and 6 bits;

FIG. 8 is a view showing pilot bit patterns when the Npilot data sizes of the uplink DPCCH are 7 and 8 bits;

DESCRIPTION OF THE EMBODIMENT

Figure 1:
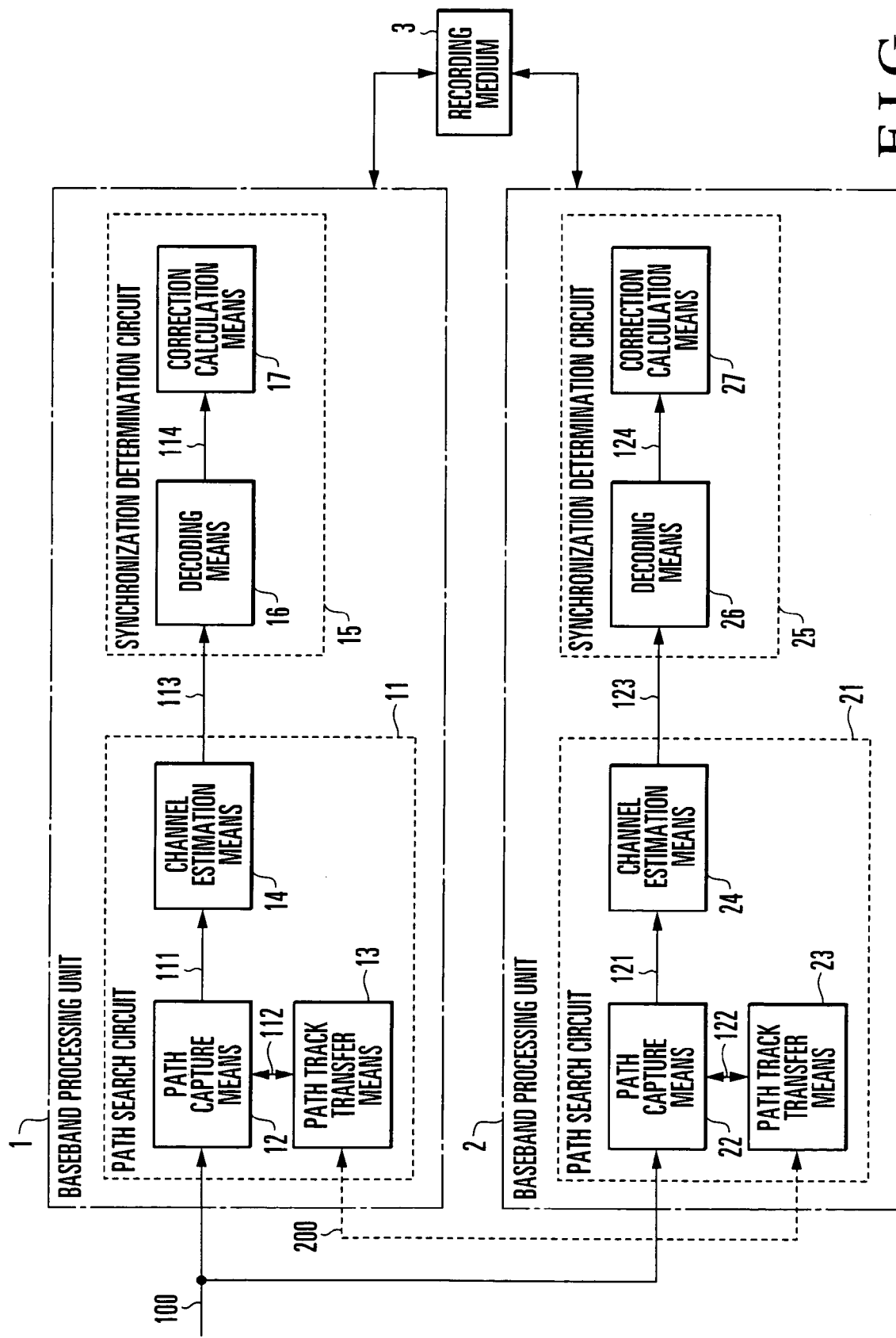
FIG. 1 is a block diagram showing the arrangement of a node-B according to an embodiment of the present invention.

An embodiment of the present invention will be described below with reference to the accompanying drawings. FIG. 1 is a block diagram showing the arrangement of a node-B (wireless base station) according to the embodiment of the present invention. This node-B according to the embodiment of the present invention includes baseband processing units 1 and 2, and a recording medium 3 connected to the baseband processing units 1 and 2. The baseband processing units 1 and 2 can operate independently of each other.

Although the node-B according to this embodiment has the two baseband processing units 1 and 2, it is easy to use an arbitrary number of baseband processing units, and give individual circuits and means in these baseband processing units in the same arrangements as the baseband processing units 1 and 2 shown in FIG. 1.

The baseband processing units 1 and 2 include path search circuits 11 and 21 having path capture means 12 and 22, path track transfer means 13 and 23 connected to the path capture means 12 and 22, and channel estimation means 14 and 24 connected to the path capture means 12 and 22, respectively. The baseband processing units 1 and 2 also include synchronization determination circuits 15 and 25 having decoding means 16 and 26 connected to the channel estimation means 14 and 24, and correction calculation means 17 and 27 connected to the decoding means 16 and 26, respectively.

Figure 2A:
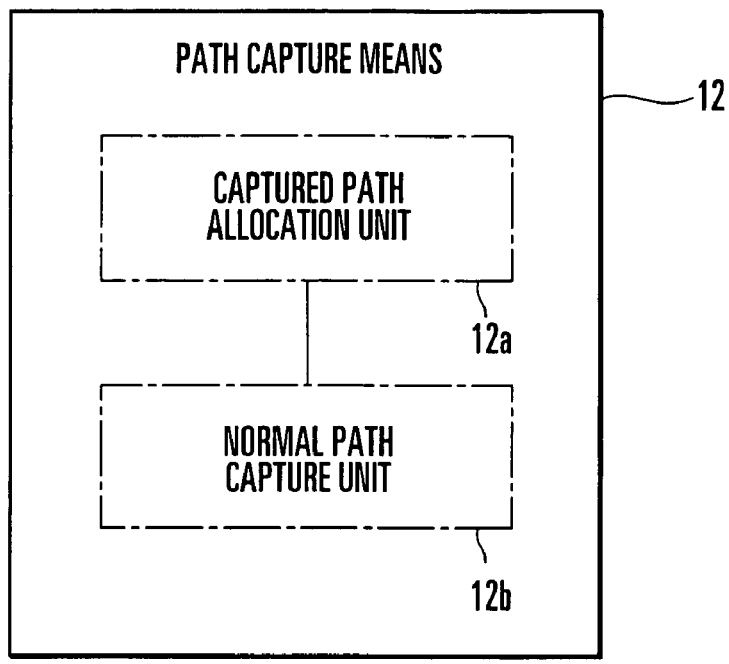
FIGS. 2A to 2E are block diagrams showing the arrangement of the node-B according to the embodiment of the present invention.

As shown in FIG. 2A, the path capture means 12 includes a captured path allocation unit 12a which arbitrarily allocates a temporary captured path near a propagation delay which is set from a host apparatus (not shown) to the node-B (not shown) when a wireless link is set in a state in which no up carrier is present, and a normal path capture unit 12b which performs a normal path capture process for an input signal from a signal line 100. The path capture means 22 has the same arrangement.

The path capture means 12 and 22 also have interfaces with the channel estimation means 14 and 24, and transfer the information of captured paths to the channel estimation means 14 and 24 via signal lines 111 and 121, respectively. Furthermore, the path capture means 12 and 22 have interfaces with the path track transfer means 13 and 23, perform transfer of the information of captured paths to the path track transfer means 13 and 23 and read of the information of paths transferred from the path track transfer means 13 and 23 via signal lines 112 and 122, respectively.

That is, in a wireless frame synchronization method using determination by a pilot bit pattern and determination by an SIR (Signal-to-Interference Ratio), even when receiving a signal from a state in which no upward signal is input to the path search circuit 11 of the baseband processing unit 1 in the node-B (wireless base station), the path capture means 12 reduces the pull-in required time before wireless frame synchronization establishment, and holds this time within a predetermined time.

The path capture means 12 and 22 have the function of allocating a temporary captured path near a propagation delay set from a host apparatus to the node-B when a wireless link is set from a state in which no upward signal is present, thereby reducing the time before a normal path is captured. In this case, the number of paths to be allocated for temporary capture is equal to or smaller than the maximum number of paths which can be captured. However, this number need not be any predetermined value, and can take a value of 1 (unit: path) or more.

Figure 2B:
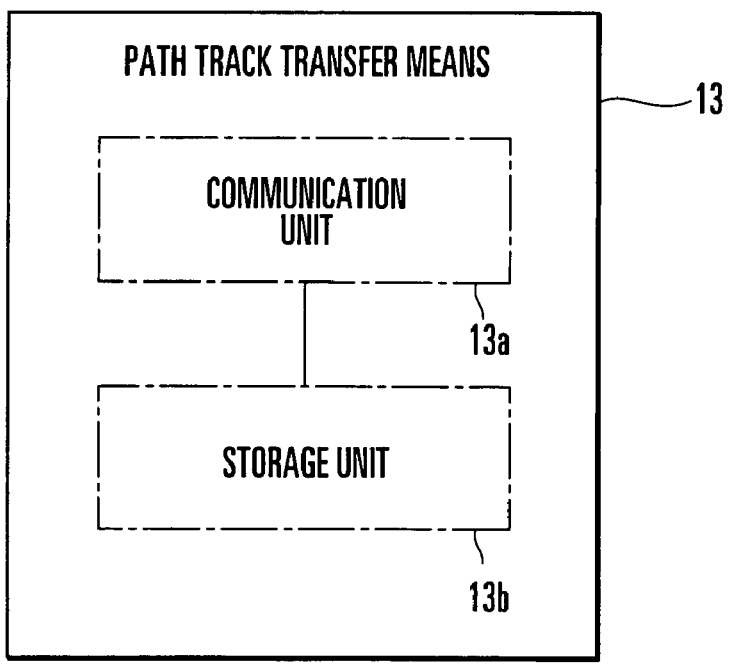

As shown in FIG. 2B, the path track transfer means 13 has a storage unit 13b for storing the information of a path transferred from the path capture means 12 via the signal line 112. The path track transfer means 13 also has a communication unit 13a which has an interface with the path track transfer means 23, and, if the baseband processing unit 1 becomes unable to continue processing, transfers, via a signal line 200, the stored path information to the path track transfer means 23 capable of processing. The path track transfer means 13 has the same arrangement.

On the basis of the path information transferred from the path track transfer means 13, the path track transfer means 23 transfers the path information to the path capture means 22 via the signal line 122, in order to allow the baseband processing unit 2 to continuously capture paths.

That is, when the path search circuit of the baseband unit in the node-B performs hard handover control, the path track transfer means 13 or 23 stores the state before handover, and transfers the path information to the destination of handover to make continuous path track possible.

When different-frequency hard handover or non-break hard handover control is to be performed for a call currently being communicated in this path track transfer means, if this resource cannot be processed due to the mechanism or processability of each node-B, the communication is continued by handing the processing over to a new resource. In this case, the path information captured by the original resource is stored, and the stored path information is transferred to the new resource to make continuous path track possible. The number of paths captured and stored in the original resource and the number of paths to be transferred to the new resource is 0 (unit: path) or more, and equal to or smaller than the maximum number of paths, on the basis of the state of path capture in the original resource.

Figure 2C:
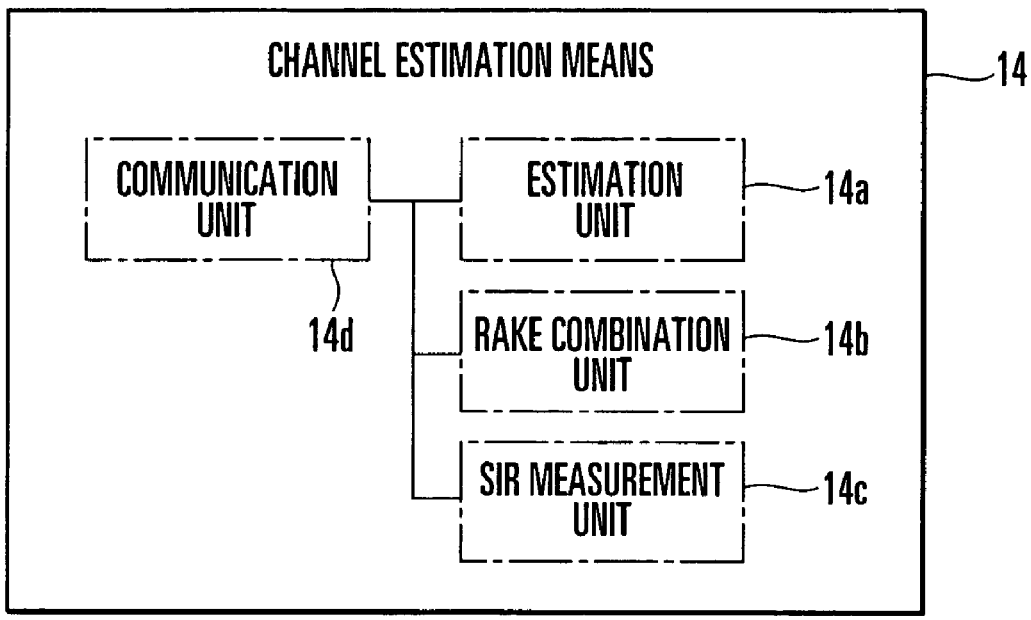

As shown in FIG. 2C, the channel estimation means 14 and 24 include an estimation unit 14a and RAKE combination unit 14b for performing channel estimation and RAKE combination, respectively, for paths captured by the path capture means 12 and 22, and an SIR measurement unit 14c for measuring the SIR for each slot. The channel estimation means 14 and 24 also include a communication unit 14d which has an interface with the decoding means 16 and 26 in the synchronization determination circuits 15 and 25, and transfers the RAKE-combined pilot data sequence and the SIR measurement results of individual slots via signal lines 113 and 123.

That is, the channel estimation means 14 and 24 perform channel estimation, RAKE combination, and SIR measurement for each slot on the basis of the path information captured in the path search circuit of the baseband processing unit in the node-B by the path capture means and path track transfer means.

Figure 2D:
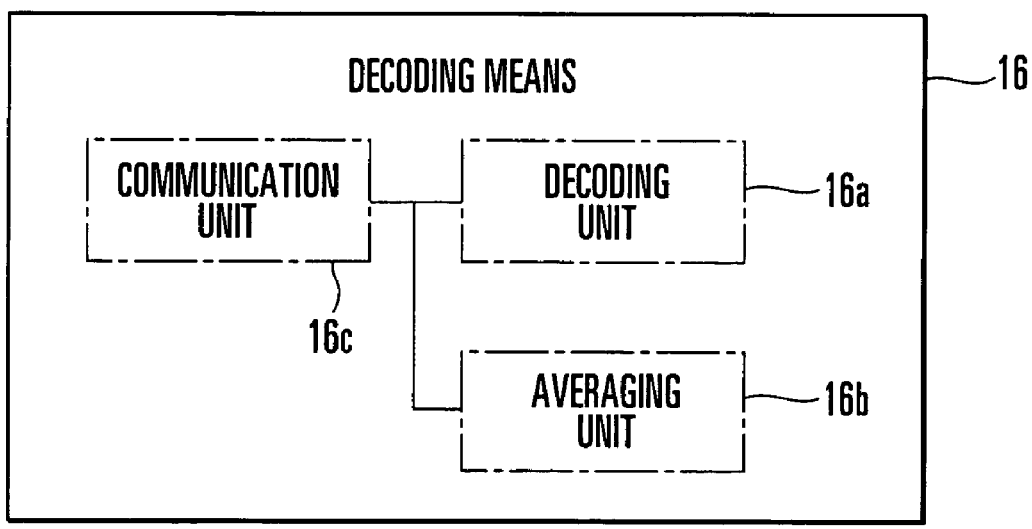

As shown in FIG. 2D, the decoding means 16 and 26 include a decoding unit 16a for decoding the RAKE-combined pilot data sequence obtained by the channel estimation means 14 and 24, and an averaging unit 16b which calculates the average per wireless frame of the SIRs measured for individual slots. The decoding means 16 and 26 also include a communication unit 16c which has an interface with the correction calculation means 17 and 27, and transfers the decoded pilot bit information and the average SIR information per wireless frame via signal lines 114 and 124.

That is, the decoding means 16 decodes, in the synchronization determination circuit 15 of the baseband processing unit in the node-B, the RAKE-combined pilot data sequence per wireless frame obtained by the channel estimation means in the path search circuit, and measures the average SIR per wireless frame.

Figure 2E:
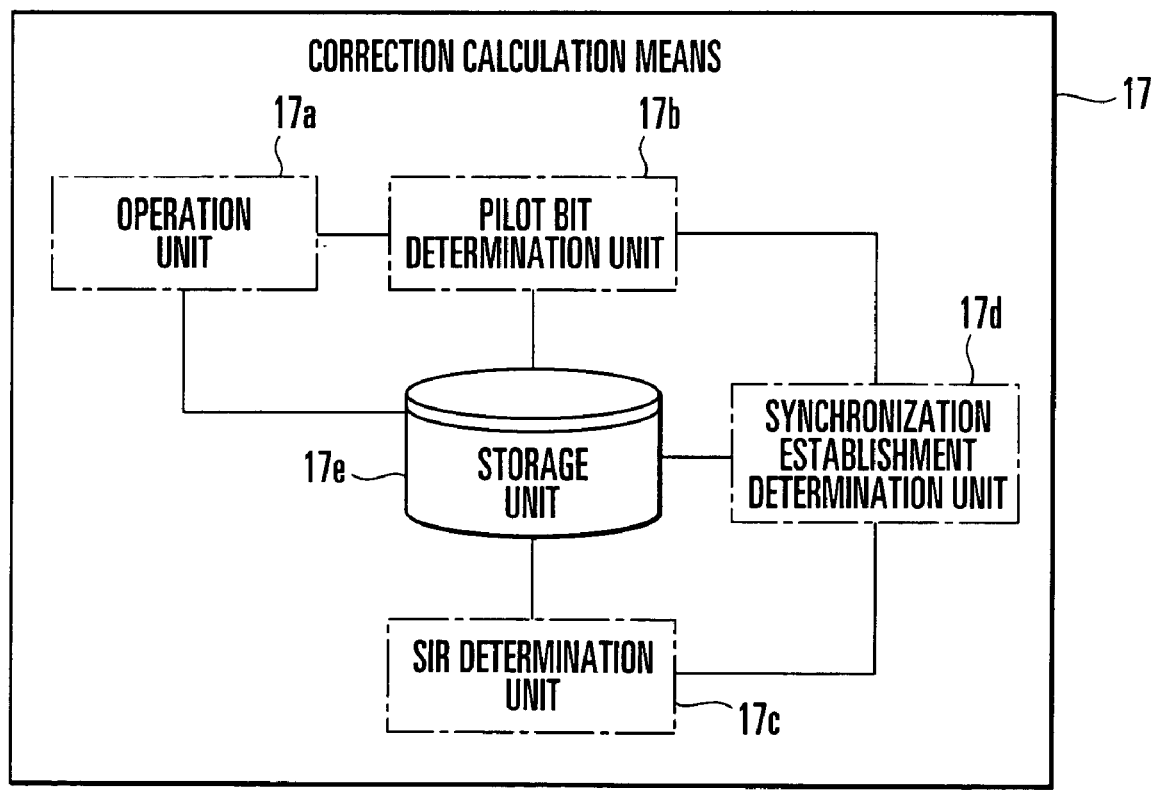

As shown in FIG. 2E, the correction calculation means 17 and 27 include an operation unit 17a which, on the basis of the one-wireless-frame pilot bit information decoded by the decoding means 16 and 26, calculates critical values "the number of post-correction backward protection pilot error allowable bits" and "the number of post-correction forward protection pilot error allowable bits" to be used when wireless frame synchronization determination is actually performed, from a parameter "the number of standard slot format pilot bits" and critical values "the number of backward protection pilot error allowable bits" and "the number of forward protection pilot error allowable bits" by using a correction calculation method represented by equation (1) to be presented later, and a pilot bit determination unit 17b which determines pilot bit reception OK/NG with respect to "the number of post-correction backward protection pilot error allowable bits" and "the number of post-correction forward protection pilot error allowable bits".

The correction calculation means 17 and 27 also include a storage unit 17e which stores the parameter "the number of standard slot format pilot bits" and the critical values "the number of backward protection pilot error allowable bits" and "the number of forward protection pilot error allowable bits".

That is, the storage unit 17e stores the parameter "the number of standard slot format pilot bits" based on the number of pilot bits in the uplink DPCCH (Dedicated Physical Control Channel) per wireless frame when an up slot format to be used is to be changed and all the 15 slots of one wireless frame are received, and the critical value "the number of backward protection pilot error allowable bits" for determining pilot bit reception OK in wireless frame synchronization determination, and the critical value "the number of forward protection pilot error allowable bits" for determining pilot bit reception NG.

The operation unit 17a calculates the critical values "the number of post-correction backward protection pilot error allowable bits" and "the number of post-correction forward protection pilot error allowable bits" for actually determining pilot reception OK/NG from "the number of standard slot format pilot bits", "the number of backward protection pilot error allowable bits", and "the number of forward protection pilot error allowable bits" in accordance with the actually received pilot bits per wireless frame.

Figure 8:
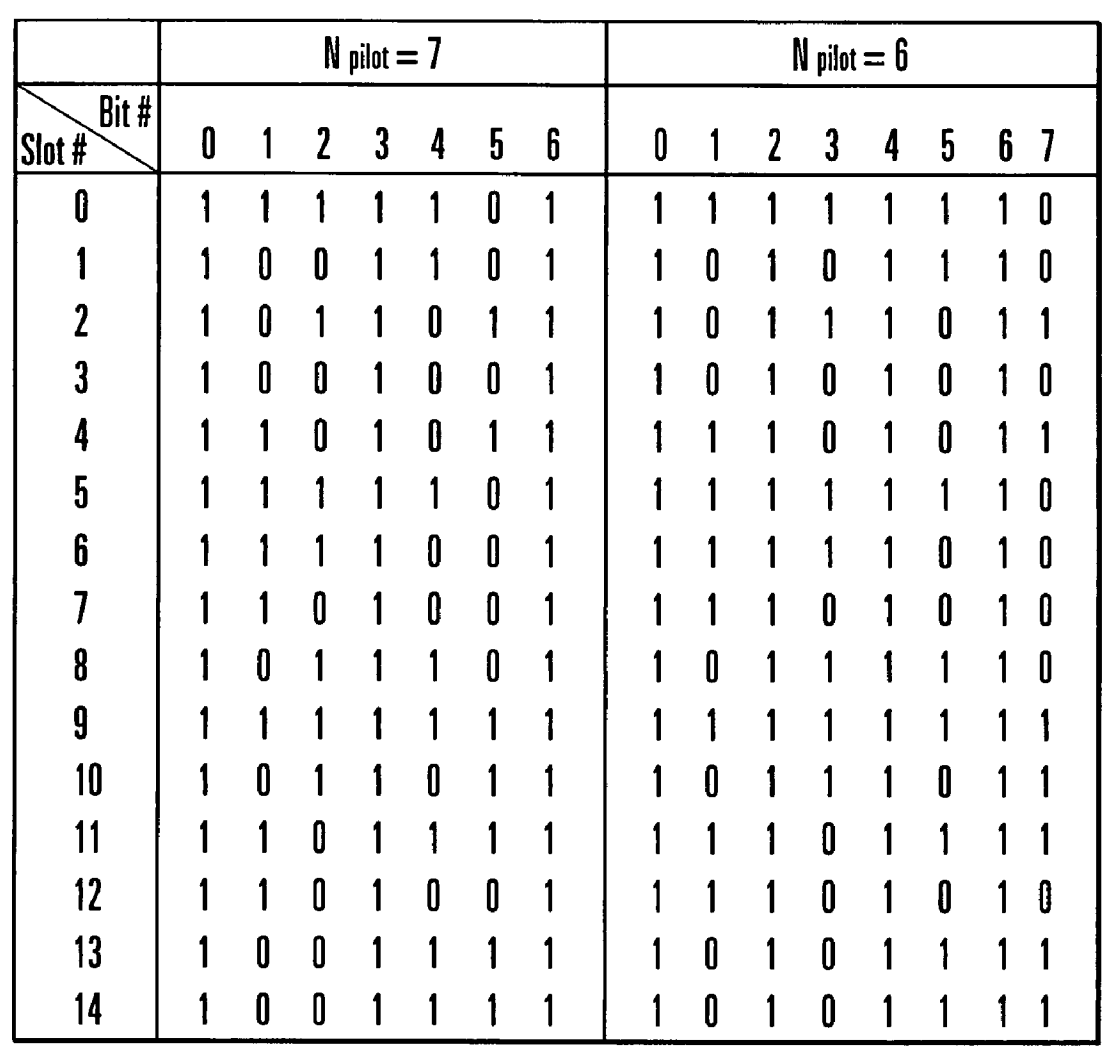

The parameter "the number of standard slot format pilot bits" described above represents the number of pilot bits per wireless frame in the wireless frame structure of the uplink DPCCH as shown in FIGS. 6 to 8.

FIG. 6 shows the wireless frame structure of the uplink DPCCH in the CDMA method. FIG. 7 shows pilot bit patterns when the Npilot data sizes of the uplink DPCCH are 3, 4, 5, and 6 bits. FIG. 8 shows pilot bit patterns when the Npilot data sizes of the uplink DPCCH are 7 and 8 bits.

Referring to FIG. 7, bit#0 and bit#1 of Npilot=3, bit#1 and bit#2 of Npilot=4, bit#0, bit#1, bit#3, and bit#4 of Npilot=5, and bit#1, bit#2, bit#4, and bit#5 of Npilot=6 are frame synchronization words, and used to determine wireless frame synchronization.

Likewise, referring to FIG. 8, bit#1, bit#2, bit#4, and bit#5 of Npilot=7 and bit#1, bit#3, bit#5, and bit#7 of Npilot=8 are frame synchronization words, and used to determine wireless frame synchronization. In FIGS. 7 and 8, pilot bit patterns other than the frame synchronization words are "1".

Of these pilot bit patterns, selection can be performed from field information (slot format#0, slot format#2, and slot format#5) corresponding to a normal mode (the number of transmission slots per wireless frame is 15 time slots). That is, "the number of standard slot format pilot bits" is 90 (unit: bit) if slot format#0 is the standard slot format, and 75 (unit: bit) if slot format#2 or slot format#5 is the standard slot format.

Also, the correction calculation means 17 and 27 include an SIR determination unit 17c for determining SIR determination OK/NG by using critical values "a backward protection SIR threshold value" and "a forward protection SIR threshold value" with respect to the average SIR information measured by the decoding means 16 and 26.

The correction calculation means 17 and 27 further include a synchronization establishment determination unit 17d which determines whether a state in which pilot bit reception is OK and SIR determination is OK continues for a predetermined frame period, by using a critical value "the number of frame synchronization backward protection steps". If this state continues for the predetermined frame period, it is determined that wireless frame synchronization establishment is detected.

Furthermore, the correction calculation means 17 and 27 determine whether a state in which pilot bit reception is NG or SIR determination is NG continues for a predetermined frame period, by using a critical value "the number of frame synchronization forward protection steps". If this state continues for the predetermined frame period, it is determined that wireless frame synchronization pull out is detected.

Also, in the baseband processing units 1 and 2 in the node-B, the correction calculation means 17 and 27 in the synchronization determination circuits store, in the storage unit 17e, the critical values "the backward protection SIR threshold value" and "the forward protection SIR threshold value" for performing SIR determination OK/NG with respect to the average SIR per wireless frame calculated by the decoding means 16 and 26 in the synchronization determination circuits.

The storage unit 17e has the critical value "the number of frame synchronization backward protection steps" for detecting wireless frame synchronization establishment when the state in which pilot bit reception is OK and SIR determination is OK continues for the predetermined frame period, and the critical value "the number of frame synchronization forward protection steps" for detecting wireless frame synchronization pull out when the state in which pilot bit reception is NG or SIR determination is NG continues for the predetermined frame period.

The critical values "the number of backward protection pilot error allowable bits" and "the number of forward protection pilot error allowable bits" described above are 0 (unit: bit) or more, and do not exceed the parameter "the number of standard slot frame pilot bits".

The critical values "the number of post-correction backward protection pilot error allowable bits" and "the number of post-correction forward pilot error allowable bits" as the output results from the correction calculation means are calculated by $$EPilot\_revise = (EPilot \times Pilot\_receive)/Pilot\_stand \quad (1)$$

In equation (1), the solution is rounded off to the nearest whole number, EPilot_revise is the critical value "the number of post-correction backward protection pilot error allowable bits" or "the number of post-correction forward protection pilot error allowable bits", EPilot is the parameter "the number of backward protection pilot error allowable bits" or "the number of forward protection pilot error allowable bits", Pilot_receive is the number of pilot bits received in one wireless frame, and Pilot_stand is the parameter "the number of standard slot format pilot bits".

In the process of calculating EPilot_revise of equation (1), the solution may also be rounded down or rounded up, instead of being rounded off, to the nearest whole number.

The critical values "the backward protection SIR threshold value" and "the forward protection SIR threshold value" fall within the range which the average SIR per wireless frame measured by the decoding means in the synchronization determination circuit can take.

The critical values "the number of frame synchronization backward protection steps" and "the number of frame synchronization forward protection steps" take a value of 0 (unit: step) or more in accordance with pilot bit reception OK/NG and SIR determination OK/NG.

The recording medium 3 stores programs for implementing the processes of the individual means of the baseband processing units 1 and 2 described above by using a computer (not shown), and the programs are read out from this computer for performing the processes of the baseband processing units 1 and 2 and executed.

Figure 3:
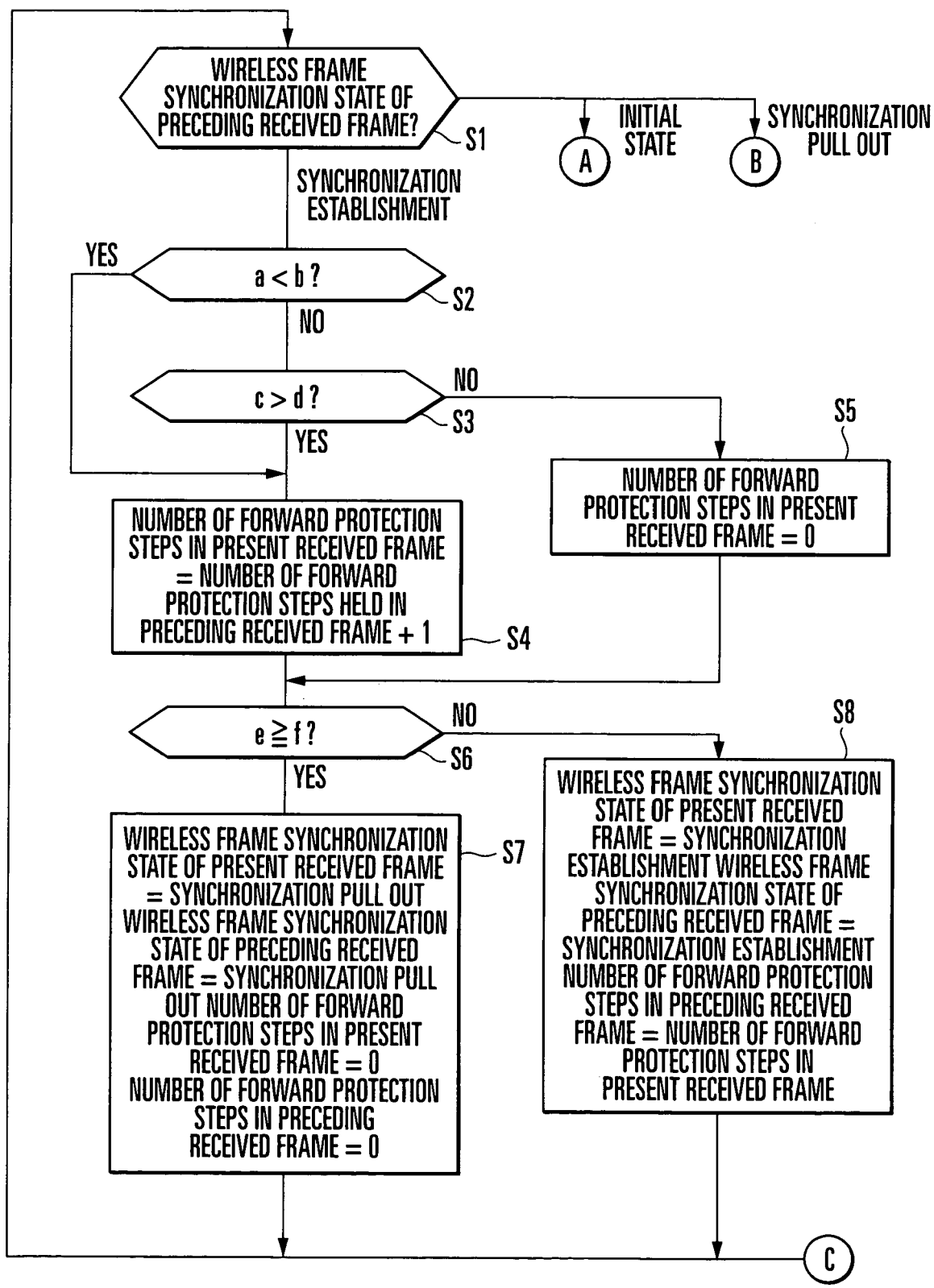
FIG. 3 is a flowchart showing a wireless frame synchronization determination process performed by correction calculation means shown in FIG. 1.
Figure 4:
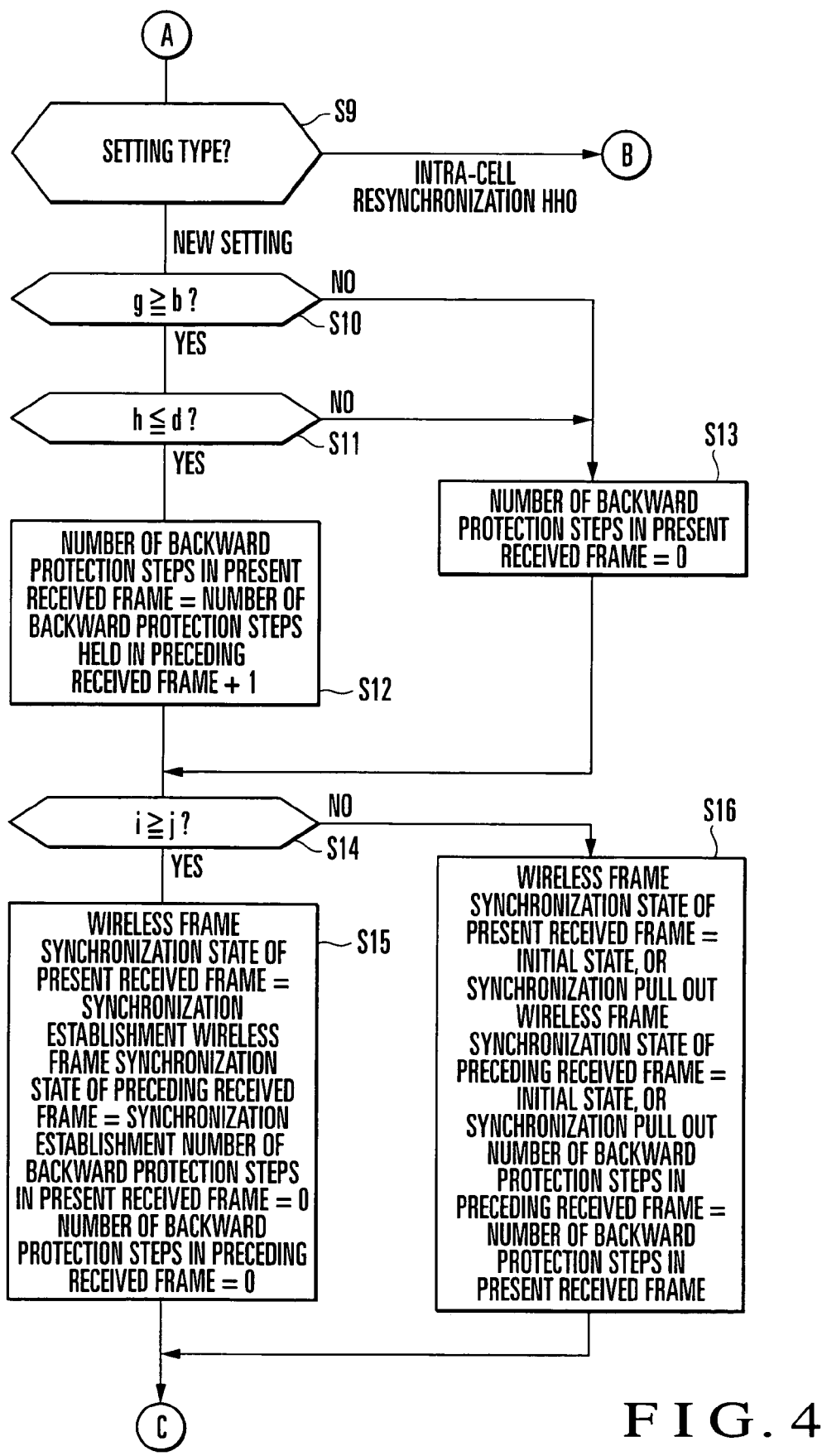
FIG. 4 is a flowchart showing the wireless frame synchronization determination process performed by the correction calculation means shown in FIG. 1.
Figure 5:
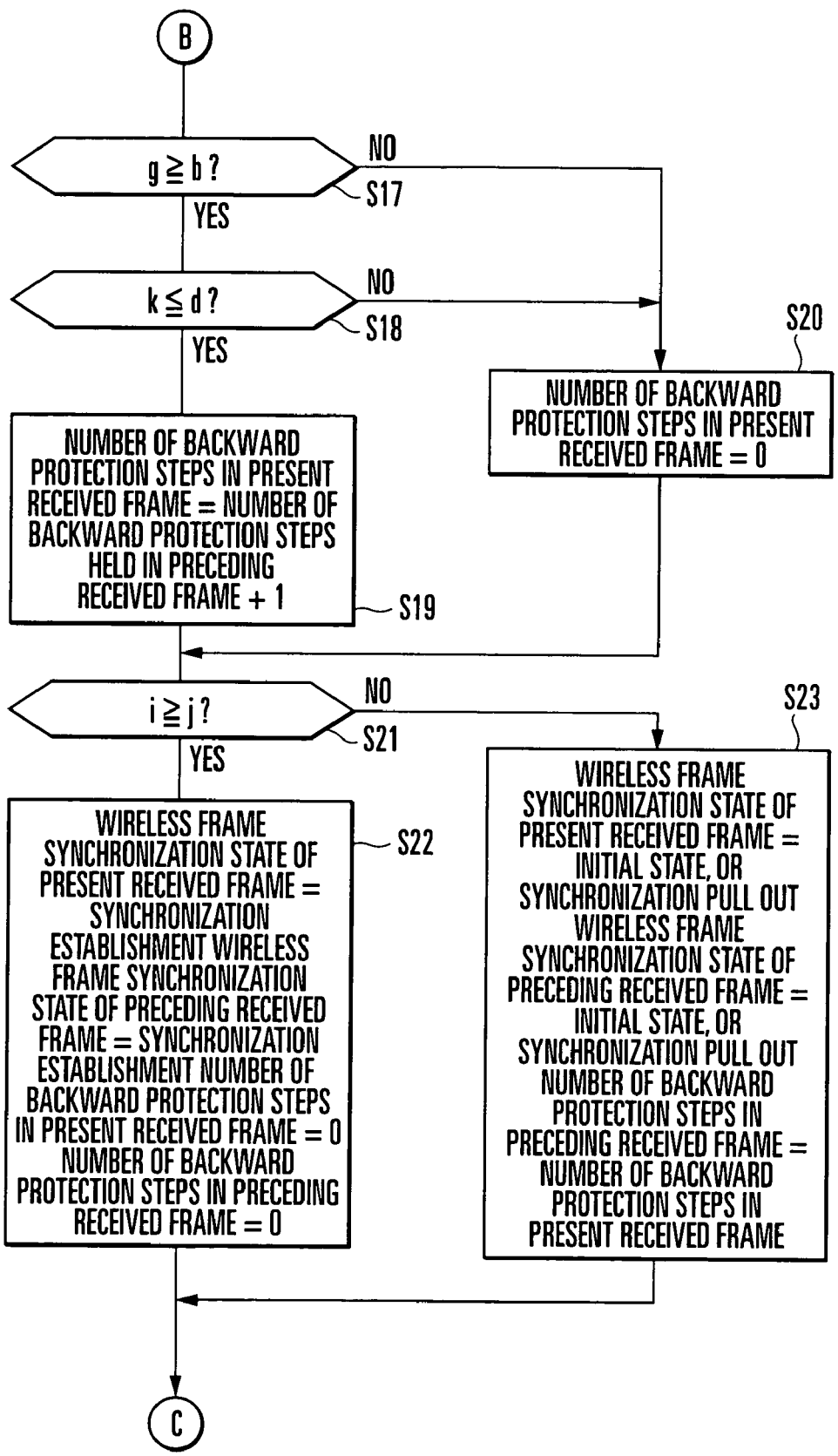
FIG. 5 is a flowchart showing the wireless frame synchronization determination process performed by the correction calculation means shown in FIG. 1.
Figure 9:
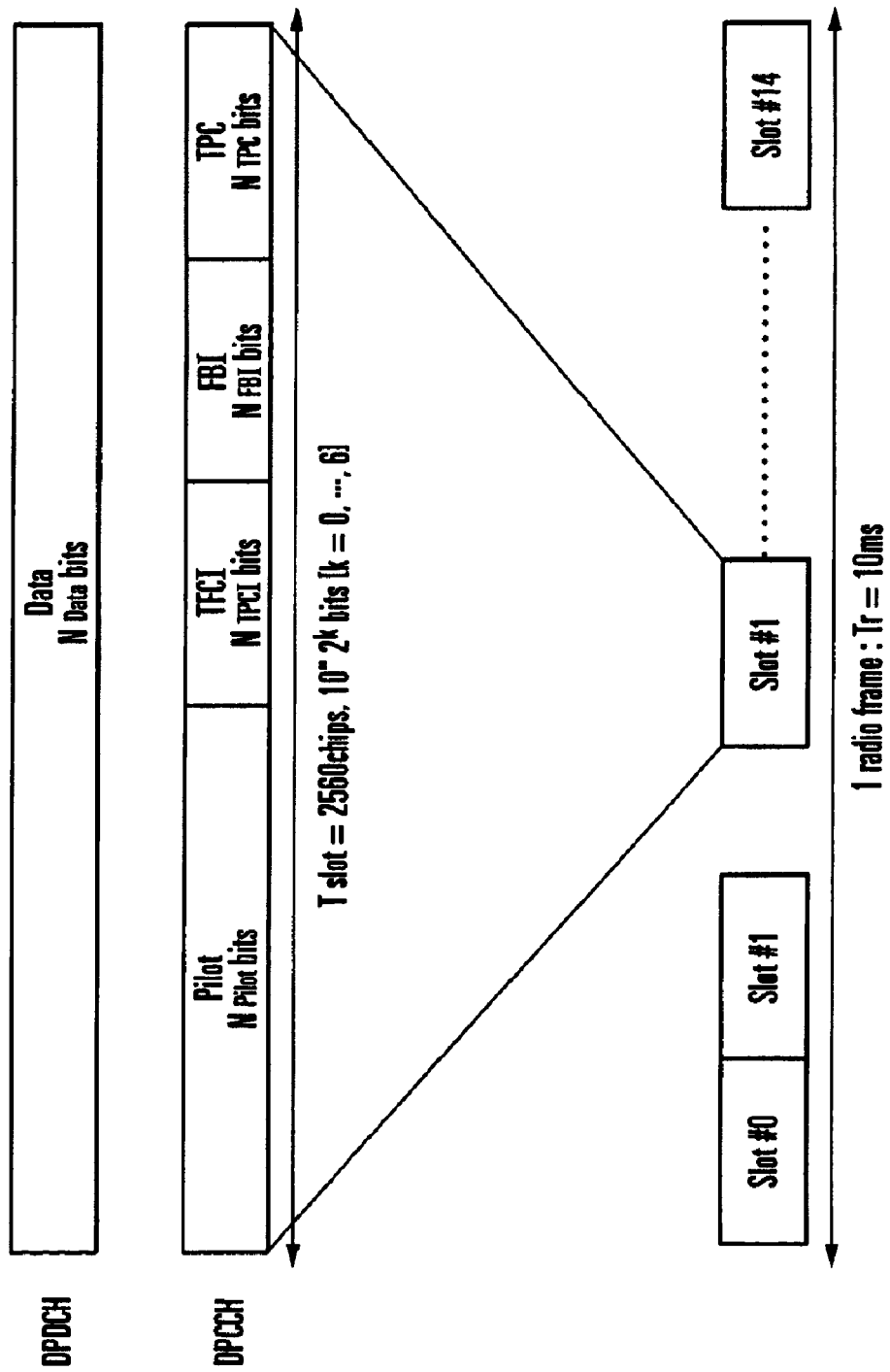
FIG. 9 is a view showing the wireless frame structure of the uplink DPCCH in the CDMA method.
Figures 10, 11:
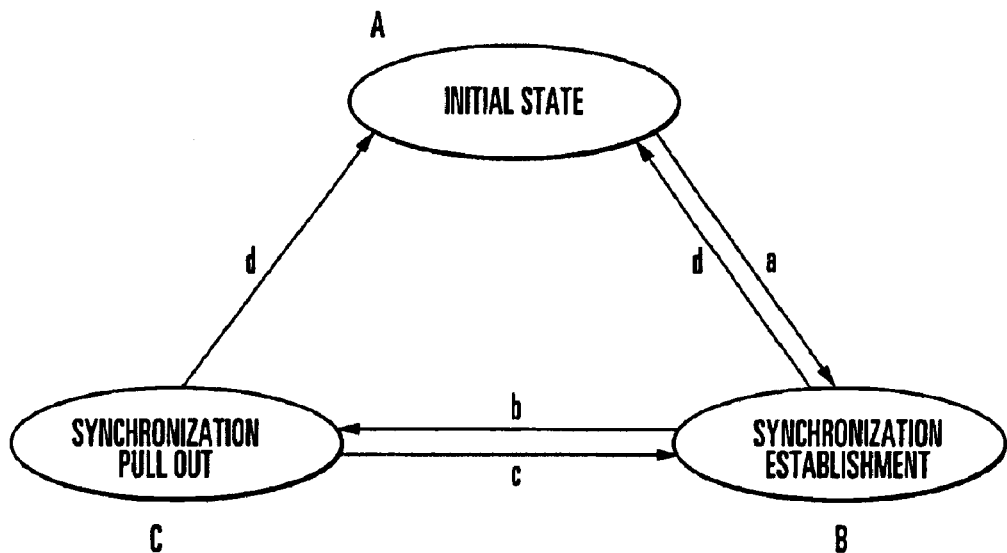
FIG. 10 is a view showing the transition of a general wireless frame synchronization detection method in the CDMA method.
FIG. 11 is a view showing the conditions of individual items in channel estimation means used in simulation.
Figure 12:
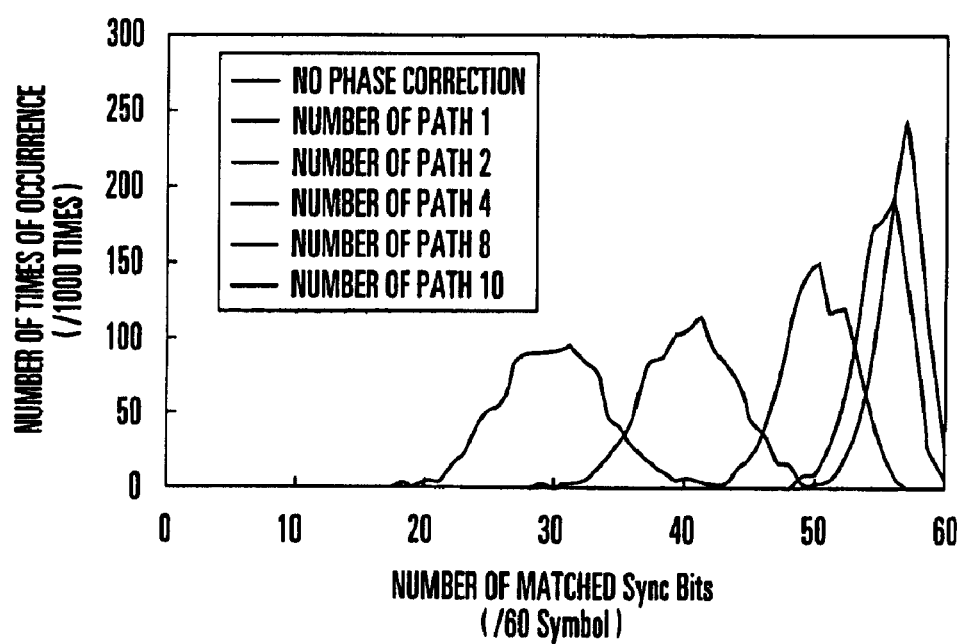
FIG. 12 is a graph in which the simulation results are plotted as a histogram.

FIGS. 3 to 5 are flowcharts showing a wireless frame synchronization determination process performed by the correction calculation means 17 and 27. The operation of the node-B according to the embodiment of the present invention will be explained below with reference to FIGS. 1 to 5. Note that the processes in FIGS. 3 to 5 are implemented by executing the programs stored in the recording medium 3 by the computer for performing the processes of the baseband processing units 1 and 2.

First, in the node-B, the maximum number of searchable paths is set to 10 (unit: path) in the path capture means 12 and 22 in the path search circuits 11 and 21, and the number of temporary captured paths allocated near the propagation delay set from the host apparatus to the node-B when a wireless link is to be set from a state in which no up carrier is present is set to 5 (unit: path). Also, parameters and critical values to be processed in the synchronization determination circuits 15 and 25 and correction calculation means 17 and 27 are predetermined.

As described above, the parameter "the number of standard slot format pilot bits" can be selected from the field information (slot format#0, slot format#2, and slot format#5) corresponding to the normal mode in the wireless frame structure of the uplink DPCCH. In this embodiment, slot format#2 is selected as the standard slot format, and "the number of standard slot format pilot bits" is given as 75 (unit: bit).

The critical values "the number of backward protection pilot error allowable bits" and "the number of forward protection pilot error allowable bits" must be 0 (unit: bit) or more, and must not exceed the parameter "the number of standard slot format pilot bits". In this embodiment, "the number of backward protection pilot error allowable bits" and "the number of forward protection pilot error allowable bits" are given as 10 (unit: bit) and 15 (unit: bit), respectively.

The critical values "the backward protection SIR threshold value" and "the forward protection SIR threshold value" are set within the range which the average SIR per wireless frame measured by the decoding means 16 and 26 can take. In this embodiment, "the backward protection SIR threshold value" and "the forward protection SIR threshold value" are given as 0.0 (unit: dB) and −1.0 (unit: dB), respectively.

The critical values "the number of frame synchronization backward protection steps" and "the number of frame synchronization forward protection steps" are set to a value of 0 (unit: step) or more in accordance with pilot bit reception OK/NG and SIR determination OK/NG. In this embodiment, "the number of frame synchronization backward protection steps" and "the number of frame synchronization forward protection steps" are given as 2 (unit: step) and 10 (unit: step), respectively.

Furthermore, the number of received pilot bits per wireless frame decoded by the decoding means 16 and 26 in the synchronization determination circuits 15 and 25 is set to 90 (unit: bit), i.e., set to slot format#0 of the field information corresponding to the normal mode in the wireless frame structure of the uplink DPCCH.

Under the above conditions, the operation of the node-B according to this embodiment will be described below with reference to FIGS. 1 to 5. In the operation of this embodiment, processing from the setting of a wireless link from a state in which no up carrier is present, to the detection of synchronization establishment in a wireless frame synchronization determination process will be explained.

When detecting a normal path for an input signal from the signal line 100, the path capture means 12 in the path search circuit 11 starts a capture process by using temporary path positions allocated near the propagation delay as reference positions. The path capture means 12 operates by this number of temporary captured paths until a normal path is captured. The path capture means 12 transfers information of the captured paths (information of 5 temporary captured paths, to be referred to as 5-path information hereinafter) to the channel estimation means 14 via the signal line 111. The path capture means 12 also transfers the 5-path information to the path track transfer means 13 via the signal line 112.

In accordance with the 5-path information transferred from the path capture means 12, the channel estimation means 14 performs channel estimation, RAKE combination, and SIR measurement for each slot, and transfers the RAKE-combined pilot sequence data and the SIRs of individual slots to the decoding means 16 via the signal line 113. The path track transfer means 13 stores the 5-path information transferred from the path capture means 12.

The decoding means 16 decodes the RAKE-combined pilot data sequence obtained by the channel estimation means 14, and calculates the average per wireless frame of the SIRs measured for individual slots. The decoding means 16 transfers the decoded pilot bits and the average SIR per wireless frame to the correction calculation means 17 via the signal line 114.

By using the pilot bits and the average SIR per wireless frame transferred from the decoding means 16, the correction calculation means 17 first refers to the wireless frame synchronization state of the immediately preceding frame (step S1 in FIG. 3).

Since in this embodiment the operation starts from the state in which no up carrier is present, the processing starts from the initial state, so the correction calculation means 17 refers to the setting type after setting the wireless frame synchronization state to the initial state (step S9 in FIG. 4).

Since in this embodiment a wireless link is set from the state in which no up carrier is present, this setting is processed as new setting, so the correction calculation means 17 sets the setting type to new setting, and calculates the critical value "the number of post-correction backward protection received pilot error allowable bits" by the calculation method of equation (1) by using the preset parameter and critical value.

In this case, the critical value "the number of backward protection pilot error allowable bits" EPilot is 10 (bits), the parameter "the number of standard slot format pilot bits" Pilot_stand is 75 (bits), and the number of pilot bits received in one wireless frame (slot format#0 of the uplink DPCCH) Pilot_receive is 90 (bits), so the critical value "the number of post-correction backward protection pilot error allowable bits" EPilot_revise is EPilot_revise=(10×90)/75=12 (bits)

The correction calculation means 17 sets the critical value "the number of post-correction backward protection pilot error allowable bits" to 12 (unit: bit) and the number of pilot error bits in the decoded pilot data sequence to 10 (unit: bit), and determines "the critical value: the number (g) of post-correction backward protection pilot error allowable bits≧the number (b) of pilot error bits in the decoded pilot data sequence" (step S10 in FIG. 4).

In the above example, "the critical value: the number of post-correction backward protection pilot error allowable bits=12 bits", and "the number of pilot error bits in the decoded pilot data sequence=10 bits", so the determination result is YES, and the correction calculation means 17 sets the average SIR per wireless frame at this time to 0.0 (unit: dB), and determines "the critical value: a backward protection SIR threshold value A (h)≦an average SIR (d) per wireless frame" (step S11 in FIG. 4).

In this example, "the critical value: the backward protection SIR threshold value A=0.0 dB", and "the average SIR per wireless frame=0.0 dB", so the determination result is YES, and the correction calculation means 17 performs processing by which "the number of backward projection steps in the present received frame=the number of backward protection steps held in the preceding received frame+1 (steps)" (step S12 in FIG. 4).

In this processing, the number of backward protection steps held in the preceding received frame=0, so the number of received frame backward protection steps is 1 (unit: step). After that, the correction calculation means 17 determines "the number (i) of backward protection steps in the present received frame≧the critical value: the number (j) of frame synchronization backward protection steps" (step S14 in FIG. 4).

In the above example, the number of backward protection steps in the present received frame=1 step, and the critical value: the number of frame synchronization backward protection steps=2 steps, so the determination result is NO, and the correction calculation means 17 performs processing by which "the wireless frame synchronization state in the present received frame=the initial state, the wireless frame synchronization state in the preceding received frame=the initial state, and the number of backward protection steps in the preceding received frame (1 step)=the number of backward protection steps in the received frame (1 step)" (step S16 in FIG. 4), and returns to step S1 to determine wireless frame synchronization in the next received frame.

If the determination results are NO in steps S10 and S11, the number of backward protection steps in the present received frame=0 step is set (step S13 in FIG. 4), and the flow advances to the determination in step S14.

In this embodiment, an operation following the flows shown in FIGS. 3 to 5 is performed in the processing of the next received frame. The correction calculation means 17 follows the same process path as above to the processing in step S11 of FIG. 4, and then performs processing by which "the number of backward protection steps in the present received frame=the number of backward protection steps held in the preceding received frame+1 (steps)" (step S12 in FIG. 4).

In this processing, the number of backward protection steps held in the preceding received frame=0 step, so the number of received frame backward protection steps is 2 (unit: step). After that, the correction calculation means 17 determines "the number (i) of backward protection steps in the present received frame≧the critical value: the number (j) of frame synchronization backward protection steps" (step S14 in FIG. 4).

In the above example, the number of backward protection steps in this frame=2 steps, and the critical value: the number of frame synchronization backward protection steps=2 steps, so the determination result is YES, and the correction calculation means 17 performs processing by which "the wireless frame synchronization state in the present received frame=synchronization establishment, the wireless frame synchronization state of the preceding received frame=synchronization establishment, the number (unit: step) of backward protection steps in the preceding received frame=0 (step), and the number (unit: step) of backward protection steps in the preceding received frame=0 (step)" (step S15 in FIG. 4), detects wireless frame synchronization establishment, and returns to step S1 to determine wireless frame synchronization in the next received frame.

Processing up to synchronization establishment detection in wireless link setting and a wireless frame synchronization determination process when different-frequency hard handover control is performed will be described next. When different-frequency hard handover control is performed, the baseband processing unit 1 becomes unable to continue the processing.

In this case, the path capture means 12 in the path search circuit 11 always transfers the information of captured normal paths to the path track transfer means 13. The number of the captured paths is 8 (unit: path).

The path track transfer means 13 stores the transferred path information until the baseband processing unit 2 capable of processing is found, and transfers the stored path information to the path track transfer means 23 in the path search circuit 21 of the baseband processing unit 2 capable of processing when the baseband processing unit 2 is found.

When detecting a normal path for an input signal during different-frequency hard handover control, the path capture means 22 reads out the path information transferred to the path track transfer means 23, and operates by the number of the transferred paths until a normal path is captured. The path capture means 22 transfers the information of the captured paths (the information of 8 transferred captured path, to be referred to as 8-path information hereinafter) to the channel estimation means 24. Also, the path capture means 22 transfers the 8-path information to the path track transfer means 23 again.

In accordance with the 8-path information transferred from the capture means 22, the channel estimation means 24 performs channel estimation, RAKE combination, and SIR measurement for each slot, and transfers the RAKE-combined pilot sequence data and the SIRs of individual slots to the decoding means 26 in the synchronization determination circuit 25. The path track transfer means 23 stores the 8-path information transferred from the capture means 22.

The decoding circuit 26 in the synchronization determination circuit 25 decodes the RAKE-combined pilot data sequence obtained by the channel estimation means 24 in the path search circuit 21, and calculates the average per wireless frame of the SIRs measured for individual slots. The decoding means 26 transfers the decoded pilot bits and the average SIR per wireless frame to the correction calculation means 27 via the signal line 124.

By using the pilot bits per wireless frame and the average SIR transferred from the decoding means 26, the correction calculation means 27 first refers to the wireless frame synchronization state of the preceding frame (step S1 in FIG. 3).

Since different-frequency hard handover control is performed in this embodiment, the processing is started from the initial state. The correction calculation means 27 sets the wireless frame synchronization state to the initial state, and refers to the setting type (step S9 in FIG. 4).

Since different-frequency hard handover control is performed in this embodiment, the processing is handled as intra-cell resynchronization HHO (Hard HandOver). The correction calculation means 27 sets the setting type to intra-cell resynchronization HHO, and calculates the critical value "the number of post-correction backward protection received pilot error allowable bits" by the calculation method of equation (1) by using the preset parameter and critical value.

In this case, the critical value "the number of backward protection pilot error allowable bits" EPilot=10 (bits), the parameter "the number of standard slot format pilot bits" Pilot_stand=75 (bits), and the number of pilot bits received in one wireless frame (slot format#0 of the uplink DPCCH) Pilot_receive=90 (bits), so the critical value "the number of post-correction backward protection pilot error allowable bits" EPilot_revise is EPilot_revise=(10×90)/75=12 (bits)

Accordingly, the correction calculation means 27 sets the critical value "the number of post-correction backward protection pilot error allowable bits" to 12 (unit: bit) and the number of pilot error bits in the decoded pilot data sequence to 10 (unit: bit), and determines "the critical value: the number (g) of post-correction backward protection pilot error allowable bits≧the number (b) of pilot error bits in the decoded pilot data sequence" (step S17 in FIG. 5).

In the above example, "the critical value: the number of post-correction backward protection pilot error allowable bits=12 (bits)", and "the number of pilot error bits in the decoded pilot data sequence=10 (bits)", so the determination result is YES, and the correction calculation means 27 sets the average SIR per wireless frame at this time to 0.0 (unit: dB), and determines "the critical value: a backward protection SIR threshold value B (k)≦the average SIR (d) per wireless frame" (step S18 in FIG. 5).

In the above example, "the critical value: the backward protection SIR threshold value B=0.0 (dB)", and "the average SIR per wireless frame=0.0 (dB)", so the determination result is YES, and the correction calculation means 27 performs processing by which "the number of backward projection steps in the present received frame=the number of backward protection steps held in the preceding received frame+1 (steps)" (step S19 in FIG. 5).

In this processing, the number of backward protection steps held in the preceding received frame=0 step, so the number of received frame backward protection steps is 1 (unit: step). After that, the correction calculation means 27 determines "the number (i) of backward protection steps in the present received frame≧the critical value: the number (j) of frame synchronization backward protection steps" (step S21 in FIG. 5).

In the above example, the number of backward protection steps in the present received frame=1 step, and the critical value: the number of frame synchronization backward protection steps=2 steps, so the determination result is NO, and the correction calculation means 17 performs processing by which "the wireless frame synchronization state in the present received frame=the initial state, the wireless frame synchronization state in the preceding received frame=the initial state, and the number of backward protection steps in the preceding received frame (1 step)=the number of backward protection steps in the received frame (1 step)" (step S23 in FIG. 5), and returns to step S1 to determine wireless frame synchronization in the next received frame.

If the determination results are NO in steps S17 and S18, the number of backward protection steps in the present received frame=0 step is set (step S20 in FIG. 5), and the flow advances to the determination in step S21.

Even in the processing of the next received frame, the correction calculation means 27 operates following the flows shown in FIGS. 3 to 5. The correction calculation means 27 follows the same process path as above to the processing in step S18 of FIG. 5, and then determines "the number (i) of backward protection steps in the present received frame≧the critical value: the number (j) of frame synchronization backward protection steps" (step S21 in FIG. 5).

In this processing, the number of backward protection steps held in the preceding received frame=1 step, so the number of received frame backward protection steps is 2 (unit: step). After that, the correction calculation means 27 determines "the number (i) of backward protection steps in the present received frame≧the critical value: the number (j) of frame synchronization backward protection steps" (step S21 in FIG. 5).

In the above example, the number of backward protection steps in the present received frame=2 steps, and the critical value: the number of frame synchronization backward protection steps=2 steps, so the determination result is YES, and the correction calculation means 27 performs processing by which "the wireless frame synchronization state of the present received frame=synchronization establishment, the wireless frame synchronization state of the preceding received frame=synchronization establishment, the number (unit: step) of backward protection steps in the preceding received frame=0 (step), and the number (unit: step) of backward protection steps in the preceding received frame=0 (step)" (step S22 in FIG. 5), detects wireless frame synchronization establishment, and returns to step S1 to determine wireless frame synchronization in the next received frame.

Processing up to synchronization pull out detection in a wireless frame synchronization determination process after wireless frame synchronization establishment detection will be described below. The path capture means 12 in the path search circuit 11 of the baseband processing unit 1 transfers path capture information of normal paths (information of 2 paths, to be referred to as 2-path information hereinafter) for an input signal from the signal line 100 to the channel estimation means 14 via the signal line 111. Also, the path capture means 12 transfers the 2-path information of the captured paths to the path track transfer means 13.

In accordance with the 2-path information transferred from the path capture means 12, the channel estimation means 14 performs channel estimation, RAKE combination, and SIR measurement for each slot, and transfers the RAKE-combined pilot sequence data and the SIRs of individual slots to the decoding means 16 in the synchronization determination circuit 15. The path track transfer means 13 stores the 2-path information transferred from the capture means 12.

The decoding circuit 16 in the synchronization determination circuit 15 decodes the RAKE-combined pilot data sequence obtained by the channel estimation means 14 in the path search circuit 11, and calculates the average per wireless frame of the SIRs measured for individual slots. The decoding means 16 transfers the decoded pilot bits per wireless frame and the average SIR to the correction calculation means 17 via the signal line 114.

By using the pilot bits and the average SIR per wireless frame transferred from the decoding means 16, the correction calculation means 17 first refers to the wireless frame synchronization state of the preceding frame (step S1 in FIG. 3).

In this embodiment, the processing is started from a state in which wireless frame synchronization is established (step S2 in FIG. 3). The correction calculation means 17 calculates the critical value "the number of post-correction backward protection received pilot error allowable bits" by the calculation method of equation (1) by using the preset parameter and critical value.

In this case, the critical value "the number of backward protection pilot error allowable bits" EPilot=15 (bits), the parameter "the number of standard slot format pilot bits" Pilot_stand=75 (bits), and the number of pilot bits received in one wireless frame (slot format#0 of the uplink DPCCH) Pilot_receive=90 (bits), so the critical value "the number of post-correction backward protection pilot error allowable bits" EPilot_revise is EPilot_revise=(15×90)/75=18 (bits)

Accordingly, the correction calculation means 17 sets the critical value "the number of post-correction backward protection pilot error allowable bits" to 18 (unit: bit) and the number of pilot error bits in the decoded pilot data sequence to 20 (unit: bit), and determines "the critical value: the number (a) of post-correction forward protection pilot error allowable bits<the number (b) of pilot error bits in the decoded pilot data sequence" (step S2 in FIG. 3).

In the above example, the critical value: the number of post-correction forward protection pilot error allowable bits=18 (bits), and the number of pilot error bits in the decoded pilot data sequence=20 (bits), so the determination result is YES, and the correction calculation means 17 performs processing by which "the number of forward projection steps in the present received frame=the number of forward protection steps held in the preceding received frame+1 (steps)" (step S4 in FIG. 3).

In this processing, the number of forward protection steps held in the preceding received frame=0 step, so the number of received frame forward protection steps is 1 (unit: step). After that, the correction calculation means 17 determines "the number (e) of forward protection steps in the present received frame≧the critical value: the number (f) of frame synchronization forward protection steps" (step S6 in FIG. 3).

In the above example, the number of forward protection steps in the present received frame=1 step, and the critical value: the number of frame synchronization forward protection steps=10 steps, so the determination result is NO, and the correction calculation means 17 performs processing by which "the wireless frame synchronization state in the present received frame=synchronization establishment, the wireless frame synchronization state in the preceding received frame=synchronization establishment, and the number of forward protection steps in the preceding received frame (1 step)=the number of forward protection steps in the received frame (1 step)" (step S8 in FIG. 3), and returns to step S1 to determine wireless frame synchronization in the next received frame.

Even in the processing of the next received frame, the correction calculation means 17 operates following the flows shown in FIGS. 3 to 5. The correction calculation means 17 follows the same process path as above to determine in step S4 that the number of forward protection steps of the present received frame is 10 steps, and then determines "the number (e) of forward protection steps in the present received frame≧the critical value: the number (f) of frame synchronization forward protection steps" (step S6 in FIG. 3).

In the above example, the number of forward protection steps in the present received frame=10 steps, and the critical value: the number of frame synchronization forward protection steps=10 steps, so the determination result is YES, and the correction calculation means 17 performs processing by which "the wireless frame synchronization state in the present received frame=synchronization pull out, the wireless frame synchronization state of the preceding received frame=synchronization pull out, the number (unit: step) of forward protection steps in the preceding received frame=0 (step), and the number (unit: step) of forward protection steps in the preceding received frame=0 (step)" (step S7 in FIG. 3), detects wireless frame synchronization pull out, and returns to step S1 to determine wireless frame synchronization in the next received frame.

If the determination result is NO in step S2 described above, the correction calculation means 17 determines "a forward protection SIR threshold value (c)>the average SIR (d) per wireless frame" (step S3 in FIG. 3).

If the determination result is NO in step S3, the number of forward protection steps in the present received frame=0 step is set (step S5 in FIG. 3), and the flow advances to the determination in step S6. If the determination result is YES in S3, the flow advances to step S4.

Note that in the operation of this embodiment, the critical values: the backward protection SIR threshold value A and backward protection SIR threshold value B are set and selectively used in accordance with the setting types. However, it is easy to combine these critical values into one value or divide them into a plurality of values in accordance with the wireless characteristic environment. This similarly applies to the critical values: the forward protection SIR threshold values.

In this embodiment as described above, a temporary captured path is set near the propagation delay which is set from the host apparatus to the node-B even in a state in which no up carrier is present, and, when different-frequency hard handover control is to be performed, path information captured by the original resource is transferred to the new resource. Since this makes it possible to shorten the processing time before a normal path is captured, it is possible to shorten the processing time before synchronization establishment is detected during wireless frame synchronization determination.

Also, in this embodiment, the wireless frame synchronization method using determination by pilot bit patterns and determination by the SIR is provided. This makes it possible to reduce synchronization establishment detection errors and synchronization pull out detection errors occurring in the conventional methods, and the processing time of each detection can be held within a predetermined time by using the critical values for SIR determination. Consequently, it is possible to reliably detect synchronization establishment, synchronization pull out, and synchronization maintenance during wireless frame synchronization determination, and perform stable wireless frame synchronization determination by which the processing time can be held constant.

In addition, in this embodiment, "the number of standard slot format pilot bits" is set in determining pilot bit reception OK/NG, and the critical values for pilot bits as determination conditions are corrected in accordance with changes in wireless frames of the uplink DPCCH. Therefore, perfect wireless frame synchronization determination can be performed even in a wireless environment in which wireless frames of the uplink DPCCH change during communication.

Furthermore, in this embodiment, when synchronization establishment detection, synchronization pull out detection, and synchronization maintenance detection are to be performed in a given node-B of any next-generation mobile communication system using this pilot bit pattern and the SIR, the same determination standards common to all systems can be presented by applying this wireless frame synchronization determination method.

In the above embodiment, in various wireless environments in which hard handover control is performed or the up slot format to be used changes in the node-B which communicates by using the CDMA method, it is possible to shorten the time before synchronization establishment is detected, reduce synchronization establishment detection errors (or synchronization pull out detection errors) caused by interference, noise, or the like, and perform more reliable wireless frame synchronization detection, by using the path capture means 12 and 22 and path track transfer means 13 and 23, and performing the wireless frame synchronization method using determination by the pilot bit pattern and determination using the SIR.

That is, the wireless base station of the present invention sets a temporary captured path near the propagation delay set from the host apparatus to the node-B even in a state in which no up carrier is present. Also, when different-frequency hard handover control is performed, path information captured by the original resource is transferred to the new resource. Since this makes it possible to reduce the processing time before a normal path is captured, the processing time before synchronization establishment is detected during wireless frame synchronization detection can be reduced.

Another wireless base station of the present invention of the present invention provides a wireless frame synchronization method using determination by the pilot bit pattern and determination by the SIR. This makes it possible to reduce synchronization establishment detection errors and synchronization pull out detection errors occurring in the conventional methods, and the processing time of each detection can be held within a predetermined time by using the critical values for SIR determination. Consequently, it is possible to reliably detect synchronization establishment, synchronization pull out, and synchronization maintenance during wireless frame synchronization determination, and perform stable wireless frame synchronization determination by which the processing time can be held constant.

In addition, in the other wireless base station of the present invention, "the number of standard slot format pilot bits" is set in determining pilot bit reception OK/NG, and the critical values for pilot bits as determination conditions are corrected in accordance with changes in wireless frames of the uplink DPCCH. Therefore, perfect wireless frame synchronization determination can be performed even in a wireless environment in which wireless frames of the uplink DPCCH change during communication.

Furthermore, in the present invention, when synchronization establishment detection, synchronization pull out detection, and synchronization maintenance detection are to be performed in a given node-B of any next-generation mobile communication system using this pilot bit pattern and the SIR, the same determination standards common to all systems can be presented by applying the wireless frame synchronization determination method described above.

As described above, the wireless base station according to the present invention, the wireless frame synchronization detection method used therein, and the recording medium on which a program therefor is recorded are particularly suitably used in a wireless base state (node-B) which communicates by the CDMA (Code Division Multiple Access) method.

The invention claimed is:

1. A wireless base station which communicates by a Code Division Multiple Access (CDMA) method, the wireless base station comprising:
    path capture means for setting a temporary captured path near a preset propagation delay when a signal is received from a state in which no upward signal is input, and performing a normal path capture process for the input signal;
    channel estimation means for performing channel estimation, RAKE combination, and signal to interference ratio measurement per slot for a path captured by said path capture means;
    decoding means for decoding a RAKE combined pilot data sequence obtained by said channel estimation means, and calculating an average per wireless frame of the signal to interference ratios measured for individual slots; and
    correction calculation means for determining whether pilot bit reception is OK or NG on the basis of pilot bit information per wireless frame decoded by said decoding means, and determining whether signal to interference ratio determination is OK or NG with respect to signal to interference ratio average information measured by said decoding means;
    wherein said correction calculation means comprises a pilot bit determination unit which determines whether pilot bit reception is OK or NG, an SIR determination unit which determines whether signal to interference ratio determination is OK or NG, and a synchronization establishment determination unit which determines wireless frame synchronization by using results of the determination of pilot bit reception OK/NG and the determination of signal to interference ratio determination OK/NG.

2. A wireless base station according to claim 1, further comprising path track transfer means for transferring path information captured by said path capture means to a new resource which performs processing if the processing cannot be performed due to hard handover control,
    wherein said path capture means performs the normal path capture process by using the path information from the original resource.

3. A wireless base station according to claim 1, wherein said pilot bit determination unit determines whether pilot bit reception is OK or NG on the basis of a parameter based on the number of pilot bits in an uplink Dedicated Physical Control Channel (DPCCH) per wireless frame when all slots of one wireless frame are received when an up slot format to be used changes, and a critical value for performing the determination of pilot bit reception OK/NG in wireless frame synchronization determination.

4. A wireless base station according to claim 1, wherein said SIR determination unit determines whether signal to interference ratio determination is OK or NG on the basis of a critical value for performing the determination of signal to interference ratio determination OK/NG with respect to the signal to interference ratio average information measured by said decoding means.

5. A wireless base station according to claim 1, wherein said synchronization establishment determination unit detects wireless frame synchronization establishment if a state in which it is determined that pilot bit reception is OK and signal to interference ratio determination is OK continues for a predetermined frame period.

6. A wireless base station according to claim 1, wherein said synchronization establishment determination unit detects wireless frame synchronization pull out if a state in which it is determined that pilot bit reception is NG or a state in which it is determined that signal to interference ratio determination is NG continues for a predetermined frame period.

7. A wireless base station according to claim 1, wherein said correction calculation means further comprises an operation unit which calculates a critical value for determining whether pilot bit reception is OK or NG in wireless frame synchronization determination.

8. A wireless base station according to claim 2, wherein said channel estimation means comprises:
    an estimation unit which performs channel estimation for a path captured by said path capture means;
    a RAKE combination unit which performs RAKE combination; and
    an SIR measurement unit which measures a signal to interference ratio for each slot, and
    said decoding means comprises:
    a decoding unit which decodes a RAKE combined pilot data sequence obtained by said channel estimation means; and
    an averaging unit which calculates an average per wireless frame of signal to interference ratios measured for individual slots.

9. A wireless base station according to claim 1, wherein said path capture means comprises:
    a capture path allocation unit which sets a temporary captured path near a preset propagation delay when a signal is received from a state in which no upward signal is input; and
    a normal path capture unit which performs a normal path capture process for the input signal.

10. A wireless frame synchronization detection method of determining wireless frame synchronization in a wireless base station which communicates by a (Code Division Multiple Access (CDMA) method, the wireless frame synchronization detection method comprising:
    setting a propagation delay;
    setting a temporary captured path near the propagation delay when a signal is received from a state in which no upward signal is input;
    performing a normal path capture process for the input signal;
    performing channel estimation, RAKE combination, and signal to interference ratio measurement per slot for a path captured by the normal path capture process;

decoding a RAKE combined pilot data sequence;

calculating an average per wireless frame of the signal to interference ratios measured for individual slots;

determining whether pilot bit reception is OK or NG on the basis of decoded pilot bit information per wireless frame;

determining whether signal to interference ratio determination is OK or NG with respect to signal to interference ratio average information; and determining wireless frame synchronization by using results of the determination of pilot bit reception OK/NG and the determination of signal to interference ratio determination OK/NG.

11. A wireless frame synchronization detection method according to claim 10, further comprising:

transferring path information captured by the normal path capture process to a new resource which performs processing if the processing cannot be performed due to hard handover control; and performing the normal path capture process by using the path information from an original resource.

12. A wireless frame synchronization detection method according to claim 10, wherein said determining whether pilot bit reception is OK or NG comprises determining whether pilot bit reception is OK or NG on the basis of a parameter based on the number of pilot bits in an uplink Dedicated Physical Control Channel (DPCCH) per wireless frame when all slots of one wireless frame are received when an up slot format to be used changes, and a critical value for performing the determination of pilot bit reception OK/NG in wireless frame synchronization determination.

13. A wireless frame synchronization detection method according to claim 10, wherein said determining whether signal to interference ratio determination is OK or NG comprises determining whether signal to interference ratio determination is OK or NG on the basis of a critical value for performing the determination of signal to interference ratio determination OK/NG with respect to signal to interference ratio average information.

14. A wireless frame synchronization detection method according to claim 10, wherein said determining wireless frame synchronization comprises detecting wireless frame synchronization establishment if a state in which it is determined that pilot bit reception is OK and signal to interference ratio determination is OK continues for a predetermined frame period.

15. A wireless frame synchronization detection method according to claim 10, wherein said determining wireless frame synchronization detects wireless frame synchronization pull out if a state in which it is determined that pilot bit reception is NG or a state in which it is determined that signal to interference ratio determination is NG continues for a predetermined frame period.

16. A computer readable recording medium recording a program of a wireless frame synchronization detection method of determining wireless frame synchronization in a wireless base station which communicates by a Code Division Multiple Access (CDMA) method, wherein said program comprises a program which allows a computer to function as:

path capture means for setting a temporary captured path near a preset propagation delay when a signal is received from a state in which no upward signal is input, and performing a normal path capture process for the input signal;

channel estimation means for performing channel estimation, RAKE combination, and signal to interference ratio measurement per slot for a path captured by the normal path capture process;

decoding means for decoding a RAKE combined pilot data sequence, and calculating an average per wireless frame of the signal to interference ratios measured for individual slots; and correction calculation means for performing the wireless frame synchronization determination by determining whether pilot bit reception is OK or NG on the basis of decoded pilot bit information per wireless frame, and determining whether signal to interference ratio determination is OK or NG with respect to signal to interference ratio average information.

17. A computer readable recording medium according to claim 16, further comprising a program which allows a computer to function as path track transfer means for transferring path information captured by the normal path capture process to a new resource which performs processing if the processing cannot be performed due to hard handover control, and as path capture means for performing the normal path capture process by using the path information from an original resource.

* * * * *